United States Patent Office 2,903,330
Patented Sept. 8, 1959

2,903,330

METHOD FOR RETARDING EVAPORATION OF WATER FROM LARGE BODIES OF WATER

Russell G. Dressler, San Antonio, Tex.

No Drawing. Application June 30, 1958
Serial No. 745,311

7 Claims. (Cl. 21—60.5)

The present invention relates to an improved method for retarding the evaporation of water from large open bodies thereof and particularly from reservoirs and irrigation ditches having extended surfaces normally in contact with the atmosphere and more particularly relates to an improved method of applying and maintaining a monomolecular film of a non-soluble evaporation retarding substance to the extended water surfaces.

While considerable studies have been made in connection with the use of monomolecular films to retard evaporation of water, none of the methods heretofore suggested have met with any practical success when applied to large bodies of water such as are usually involved in water reservoirs and extended irrigation or water supply ditches. Although the film forming abilities of certain organic compounds have been known for a long time and monomolecular films have been successfully produced in laboratory scale investigations, many problems are encountered when such films are to be applied to large open water surfaces where not only wind action but also wave action are concerned, not only with regard to the establishment of the desired film but also with its proper maintenance. In general, it has been found rather difficult to obtain adequate film coverage on large open expanses of water and furthermore to maintain even the coverage achieved.

In the first investigations of the use of monomolecular films to retard evaporation, attempts were made to scatter flakes of the film forming material, particularly flake fatty alcohols, on reservoir surfaces but it was found that this procedure was impractical as much of the material was lost by being carried on shore by winds. Later the fatty alcohols, in flake, pelleted or other solid forms, were confined in mesh covered floats of various designs which were anchored at intervals in the reservoirs. It was found that such floats also were ineffective. The rate of spread of film from the surface of the fatty alcohol was insufficient to cover and maintain a film on any water surfaces larger than a few hundred square feet in area because on large open areas of water the wind and waves dissipate the film faster than it can be replenished from the surfaces of the fatty alcohol flakes, pellets or the like confined in the floats. Another difficulty with the float procedure is that algae and other growths accumulate thereon and clog the screens so that they become ineffective.

Another method involved application of solid fatty alcohols as powders. Difficulty, however, was encountered with caking of the material which prevented a regulated and constant rate of feeding. In addition, no practical design could be visualized for the distribution of the powdered material in very small amounts, continually at spaced intervals over considerable distances.

In addition, a solvent method was proposed and tried in which the fatty alcohol, such as hexadecanol, was completely dissolved in a solvent. The solvents used were ethyl alcohol, kerosene and other petroleum fractions. It was found, however, that applications made in this manner do not spread properly. The reason for this possibly is the fact that the fatty alcohol does not exist in the solution as solid finite particles which present solid surfaces from which the film originates. Furthermore, the high cost of solvent required, which in some cases amounts to one gallon per pound of fatty alcohol, is objectionable. In addition, a very major determent is the fact that governmental public health agencies have ruled that the suggested solvents are pollutants and cannot be added to potable water reservoirs.

It is the object of the present invention to provide an improved method of establishing and maintaining evaporation retarding monomolecular films on large expanses of open water which avoids the aforementioned difficulties.

The film forming usbstances employed according to the invention as in the past preferably are the long chained aliphatic alcohols containing 12 to 24 carbon atoms and preferably those containing 16 to 18 carbon atoms, such as hexadecanol or octadecanol, that is cetyl alcohol and stearyl alcohol. The other saturated fatty alcohols containing 12 to 24 carbon atoms also show marked effectiveness, although not to the full degree exhibited by the $C_{16}$ and $C_{18}$ alcohols. Unsaturated fatty alcohols, such as oleyl alcohol, have a still lower efficiency but can be sufficiently effective to be used under some conditions.

It was unexpectedly found according to the invention that considerably improved film formation on the surfaces of open bodies of water, as well as improved film maintenance, could be achieved by applying the film forming fatty alcohols to the water to be protected in the form of a suspension or emulsion in water with water as the continuous phase, the fatty alcohol in finely divided state forming the disperse phase. The finely divided fatty alcohol should be of such particle size that essentially the maximum dimension of the particles is approximately 0.05 inch and that the major proportion of the finely divided fatty alcohol has a particle size below 0.05 inch. The presence of a small number of particles larger than 0.05 inch would not depart from the spirit of the invention, as they would merely be a comparatively ineffective diluent. It is preferable to use fatty alcohol particle sizes which essentially have an approximate 0.03 inch maximum dimension or smaller in order to provide a large area of exposed total surface and to facilitate maintenance of a suspension or emulsion which is free from separation and settling for reasonably prolonged periods. As the finely divided fatty alcohol is applied to the bodies of water to be protected in a prewetted state, it is extremely active in producing a film when applied.

The aqueous suspensions or emulsions employed according to the invention can be prepared in a number of ways, for example, the fatty alcohol and water mixture can be put through a colloid mill, also ultrasonic vibrations can be made use of or any other intensive mechanical agitation serving to disperse the finely divided fatty alcohol in the water to produce a sufficiently stable dispersion can be employed. If desired, suspending or emulsifying agents can be added to render the dispersions more stable but such additions are not necessary as even without such additions dispersions of useful stability can be attained. It merely, in some instances, may be desirable to subject such dispersions to slight agitation or stirring to maintain proper uniformity. The presence or absence of suspending or emulsifying agents in the fatty alcohol suspensions or emulsions according to the invention has only a slight effect upon the rate of generation of films upon their application to bodies of water. Suitable suspending or emulsifying agents, for example, are the synthetic commercially available detergents of the sulfate or sulfonate type, such as, for example, sodium lauryl sulfate, sodium dodecyl benzene sulfonate, long chained alkyl sulfonates, such as are produced by the Reed process by the sulfochlorination of paraffinic hydrocarbons and subsequent saponification.

The suspensions or emulsions employed according to the invention can be made up in a number of concentrations ranging from, for example, 1% to 45% by weight or slightly more of fatty alcohol. The upper limit is determined by that amount at which the suspension exists as a fluid. However, higher concentrations of pasty consistency can be used as concentrates which are diluted down just prior to application.

The fatty alcohol suspensions or emulsions according to the invention which contain the fatty alcohol in an active finely divided prewetted state can be applied to bodies of water from which evaporation losses are to be reduced in a number of ways, such as spraying, floating-on, dripping or any combination of these, so as to give a regulated and continual make up as required under the conditions at hand. The quantities which are required to be supplied depend particularly upon the wind conditions and it has been found that even with normal wind conditions in the range of 5–20 miles per hour a rapid rate of film generation is required to maintain proper film coverage on reservoirs. While under ideal conditions (no wind or wave action) one pound of fatty alcohol would suffice to cover 100 acres water surface, substantially greater quantities are required under the normal wind conditions indicated. In general, under such normal conditions the rates of addition required are of the order of about 0.7 ounces per hour of fatty alcohol per outlet spaced on a reservoir along and parallel to the upwind shoreline at 50 to 100 foot intervals so that the film as it is formed drifts over the surface of the reservoir with the wind. When the winds over a reservoir are predominantly from one direction, it is only necessary to space points of application along one shoreline of the reservoir upwind of the prevailing wind direction. On the other hand, if winds of considerably varying directions are encountered, points of application can be provided along the entire shoreline of the reservoir so that the application can always be made from the upwind shoreline.

While the process according to the invention is primarily adapted for retarding evaporation of water from large bodies of open water, such as reservoirs, it also can be used with success for the treatment of flowing water in open water supply or irrigation ditches or canals in that the fatty alcohol suspensions or emulsions are applied to the water of the flowing water at the upstream end of the ditch or canal so that the monomolecular film which is formed flows along with the surface.

The superior effectiveness of the process according to the invention and the extreme rapidity in which the desired film formation takes place from the fatty alcohol suspensions or emulsions in which the fatty alcohol is applied to the water surface in an activated prewetted condition is demonstrated by the comparative tests carried out on an expansive reservoir surface which are summarized in the following table.

Table

| Material | Amount used | Time to transform completely to film |
| --- | --- | --- |
| Octadecanol (flake) | 1 flake (0.006 gm.). | over 6 hours. |
| Hexadecanol (flake) | do | Do. |
| Oleyl alcohol (liquid) | 1 drop | 2-5 minutes. |
| Octadecanal, 100 micron size, dry powder | 0.05 gm | 1-3 minutes. |
| Octadecanol, 100 micron size particles in water suspension using suspending agent. | 1 drop | 0.3-2.0 seconds. |
| Octadecanol, 100 micron size particles in water suspension. No suspending agent. | do | Do. |
| Oleyl alcohol, emulsified in water using emulsifying agent. | do | Do. |

The table shows that preparing the fatty alcohol in finely divided, dry form rather than in flake form increases the film generation rate by almost 200 fold. The prewetting with water, as is accomplished in the suspension step, increases the film generation rate by another 100 fold. The overall dispersion rate of the suspended, finely divided fatty alcohol, as compared with flake material, is thus increased by about 20,000 times. This phenomenal rate is responsible for the success of the process according to the invention in replenishing the film on an expansive reservoir at a rate higher than it is lost due to wind, waves or other natural forces.

Instantaneous film formation is important in the control of fatty alcohol rate of addition to the water body. The rate of addition thus can be regulated so that complete film coverage is obtained, and there is no loss of fatty alcohol material due to excessive application or to loss of material which due to retarded film formation is washed on shore.

The following examples will serve to illustrate the preparation of the fatty alcohol suspensions or emulsions employed according to the invention and the manner of their application to bodies of open water from which evaporation is to be retarded:

EXAMPLE 1

30 grams of flake octadecanol (stearyl alcohol) were powdered with a mortar and pestle after which the same was screened through a bolting cloth having openings 24 to the inch. The 30 grams were shaken with 250 grams of water containing 10 drops (0.5 gram) of a sodium dodecyl benzene sulfonate liquid synthetic detergent emulsifier, until suspended. Upon standing for two hours, it was found that the octadecanol formed in the suspension layer comprising the upper 20% of the liquid. This upper layer was entirely mobile and contained 30 grams of octadecanol suspended in approximately 50 grams of water. When a few drops of this upper layer were applied to the surface of a water body of about one foot square area, the suspending agent immediately dissolved in the water body and the finely divided octadecanol dispersed itself at once over the surface of the water body and formed a complete evaporation retardant film over the entire surface. Forced attempts to cause evaporation by normal means which might be encountered failed to cause appreciable evaporation as compared with such means when applied to untreated surfaces.

EXAMPLE 2

Powdered hexadecanol (cetyl alcohol) of average particle dimension approximately 60 microns was suspended by mechanical agitation in water containing sodium lauryl sulfate as a suspending agent, according to the following formula:

| | Weight ounces |
| --- | --- |
| Octadecanol | 7 |
| Water | 16.3 |
| Sod. lauryl sulfate | 0.21 |
| Total | 23.51 |

The resulting suspension contained an approximate 30% by weight of solids and constituted a very stable but fluid liquid suitable for pumping or dripping onto the surface of a reservoir. This product was gravimetrically stable after standing several months.

EXAMPLE 3

Powdered octadecanol of approximate average particle dimension of 100 microns was mixed with a rotating agitator mixer in a drum with water and with sodium lauryl sulfate as a suspending agent according to the following formula:

| | |
|---|---|
| Powdered octadecanol | 56 lbs. |
| Water | 114 lbs. |
| Sod. lauryl sulfate | 0 lbs. 5.3 ozs. |
| Total | 170 lbs. 5.3 ozs. |

This formed a 32% by weight suspension of solids in water and was gravimetrically stable over long periods and remained pumpable.

EXAMPLE 4

Oleyl alcohol was emulsified in water to form an oil-in-water type emulsion according to the formula below:

| | Weight ounces |
|---|---|
| Oleyl alcohol | 3.5 |
| Water | 10.0 |
| Sod. lauryl sulfate | 0.17 |
| Total | 13.67 |

The result was a product having stability for long periods while being completely fluid.

EXAMPLE 5

13 ounces of powdered octadecanol of approximately 60 micron particle size was added to 14 weight ounces of water, using a high-speed rotary mechanical agitator to facilitate the suspending operation. No suspending aids or agents were used. This mixture containing 48% by weight of solids in water was on standing a thick, relatively stable paste, of consistency suitable for pumping by a heavy duty pump.

EXAMPLE 6

A 40 acre water reservoir was treated as follows:

A stream of 30% by weight finely divided octadecanol suspended in water, prepared analogously to the suspension of Example 5, as a concentrate, was diluted continuously by pumping water from the reservoir. The proportions were 2 ounces of concentrate per minute diluted by 2.5 gallons of water per minute (about 1:150 by weight ratio). This diluted stream was distributed through lines laid along the upwind shoreline of the reservoir for some 500 yds. The lines had outlet orifices at 50 ft. intervals for equal rates of outlet of the dilute streams and their continuous application at these points on the surface of the reservoir. In one hour's time of application the complete reservoir's surface could be coated with film and the film maintained as long as the application was continued. Comparisons of the untreated reservoir and of the treated reservoir showed the saving of water to be in the range of 40%–60% of the normal evaporation loss when such treatment was made.

This is a continuation-in-part of application Serial No. 614,386, filed October 8, 1956, now abandoned.

I claim:

1. In a method of retarding normal evaporation from a body of open water having an extended surface normally in contact with the open air by the formation of a monomolecular film of a fatty alcohol containing 12 to 24 carbon atoms on such surface, the step which comprises applying such fatty alcohol to said body of water in the form of an aqueous dispersion of fatty alcohol in finely divided form, the particle size of which is such that essentially the maximum dimension of the fatty alcohol particles is up to .05 inch and that the major proportion of the finely divided fatty alcohol has a particle size below .05 inch, to form a monomolecular film of such fatty alcohol upon the water surface.

2. In a method of retarding normal evaporation from a body of open water having an extended surface normally in contact with the open air by the formation of a monomolecular film of a fatty alcohol containing 12 to 24 carbon atoms on such surface, the step which comprises applying such fatty alcohol to said body of water in the form of an aqueous dispersion of fatty alcohol in finely divided form, the particle size of which is up to 0.03 inch, to form a monomolecular film of such fatty alcohol upon the water surface.

3. In a method of retarding normal evaporation from a body of open water having an extended surface normally in contact with the open air by the formation of a monomolecular film of a fatty alcohol containing 16 to 18 carbon atoms on such surface, the step which comprises applying such fatty alcohol to said body of water in the form of an aqueous dispersion of fatty alcohol in finely divided form, the particle size of which is up to 0.03 inch, to form a monomolecular film of such fatty alcohol upon the water surface.

4. In a method of retarding normal evaporation from an open water reservoir having an extended surface in contact with the open air by the formation of a monomolecular film of a fatty alcohol containing 12 to 24 carbon atoms on such surface, the step which comprises applying such fatty alcohol to said body of water in the form of an aqueous dispersion of fatty alcohol in finely divided form, the particle size of which is such that essentially the maximum dimension of the fatty alcohol particles is up to .05 inch and that the major proportion of the finely divided fatty alcohol has a particle size below .05 inch, at a regulated rate to form and maintain a monomolecular film of such fatty alcohol upon the water surface.

5. In a method of retarding normal evaporation from an open water reservoir having an extended surface in contact with the open air by the formation of a monomolecular film of a fatty alcohol containing 12 to 24 carbon atoms on such surface, the step which comprises applying such fatty alcohol to said body of water in the form of an aqueous dispersion of fatty alcohol in finely divided form, the particle size of which is up to 0.03 inch, at a regulated rate to form and maintain a monomolecular film of such fatty alcohol upon the water surface.

6. The process of claim 5 in which said aqueous dispersion is applied at spaced intervals along the edge of the reservoir upwind of the prevailing winds.

7. The process of claim 6 in which said aqueous dispersion is applied at intervals spaced 50 to 100 feet apart.

References Cited in the file of this patent

Glazov: J. Phy. Chem. (U.S.S.R.) 11, 484–91, 1938 thru Chem. Abstr., vol. 33, 1939, p. 4105 (4).

Dervichian: Bull. Soc. Chem. Biol., 28, 426–32, 1946, thru Chem. Abstr., vol. 41, 1947, p. 4022 (b).

La Mer: Science, vol. 120, Nov. 12, 1954, p. 783.

Laycock: Water and Sewage Works, vol. 103, No. 8, August 1956, pp. 346–347.